C. CHRISTENSEN.
GANG PLOW.
APPLICATION FILED OCT. 7, 1907.
1,083,594.
Patented Jan. 6, 1914.
6 SHEETS—SHEET 3.
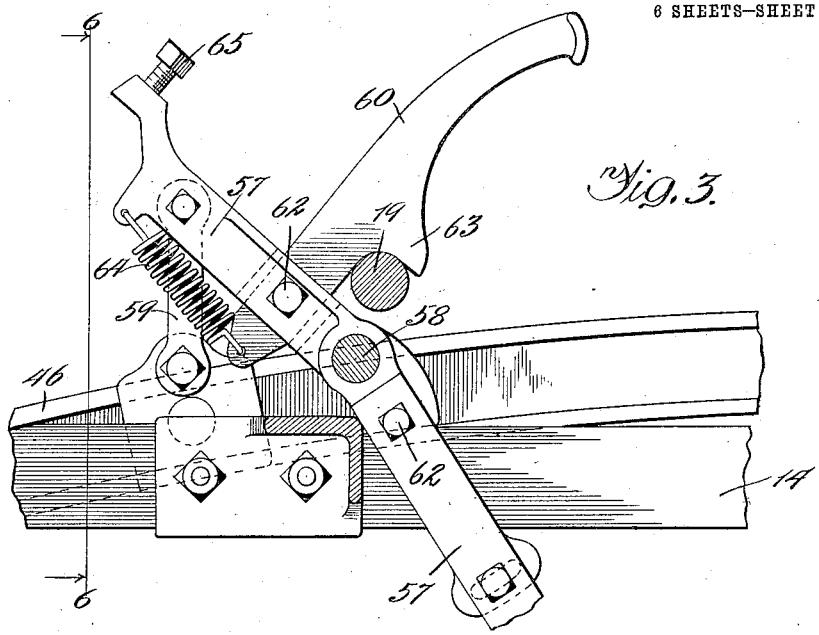
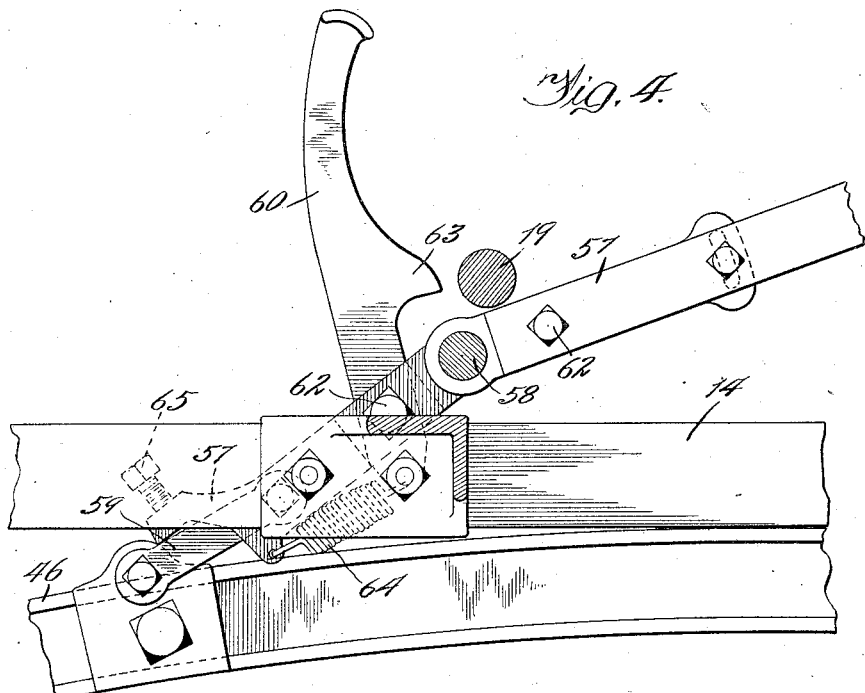

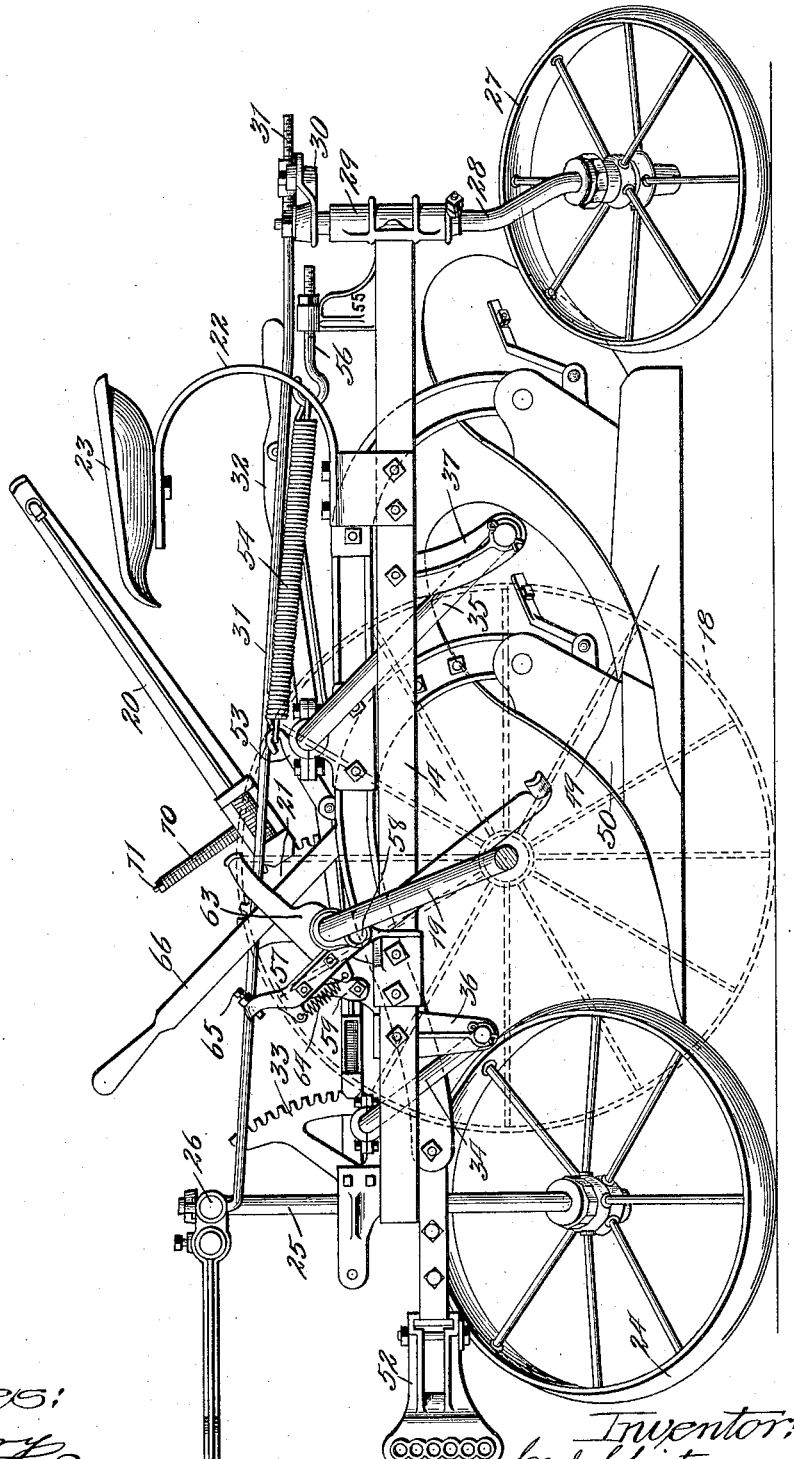

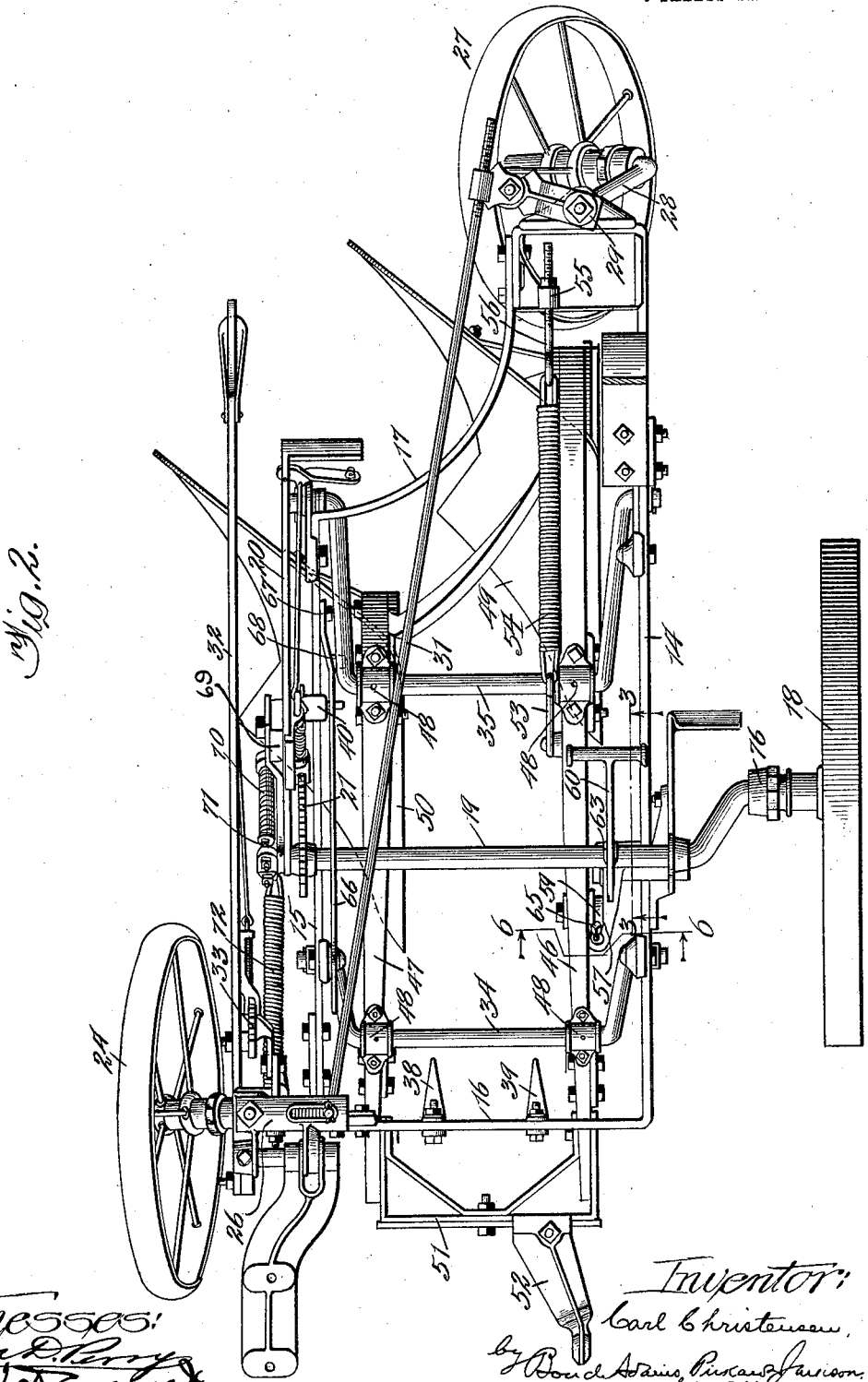

C. CHRISTENSEN.
GANG PLOW.
APPLICATION FILED OCT. 7, 1907.
1,083,594.
Patented Jan. 6, 1914.
6 SHEETS—SHEET 4.
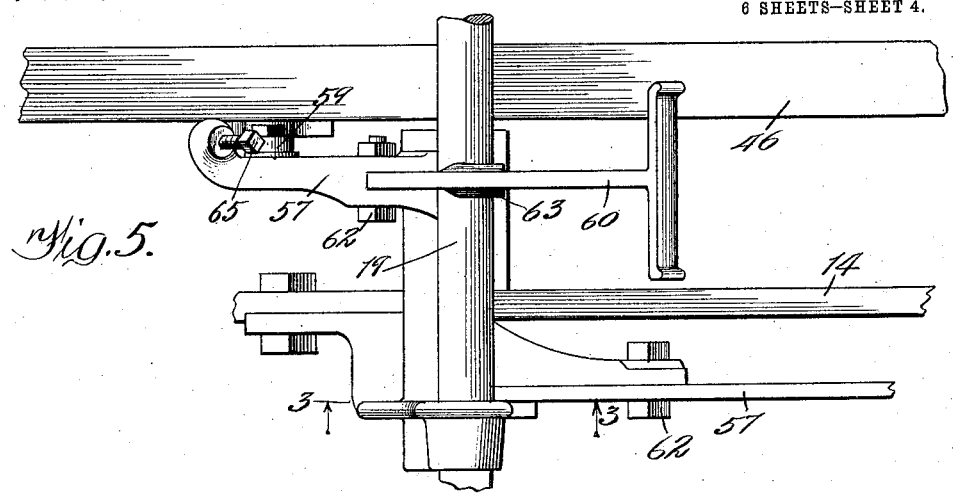
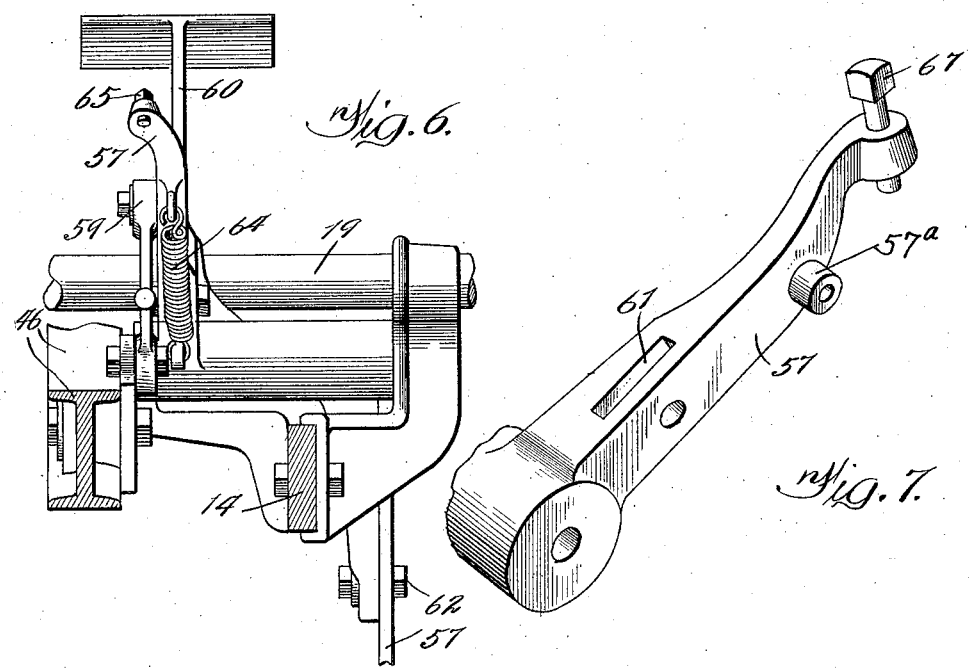

C. CHRISTENSEN.
GANG PLOW.
APPLICATION FILED OCT. 7, 1907.
1,083,594.
Patented Jan. 6, 1914.
6 SHEETS—SHEET 5.
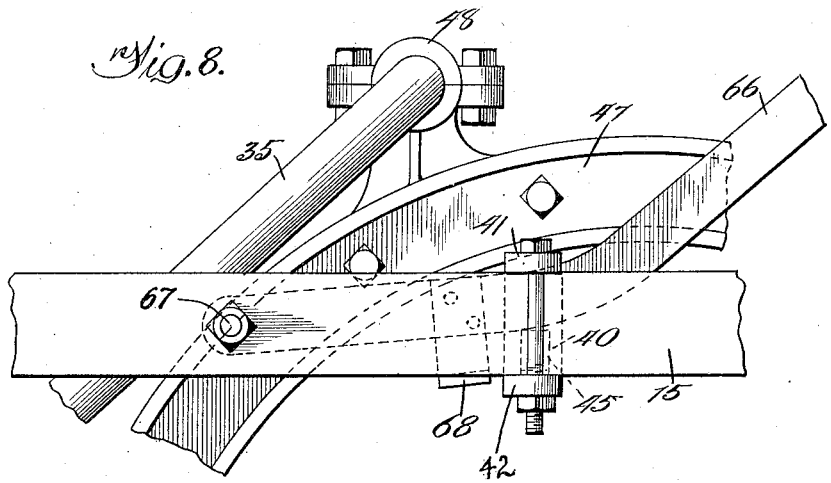
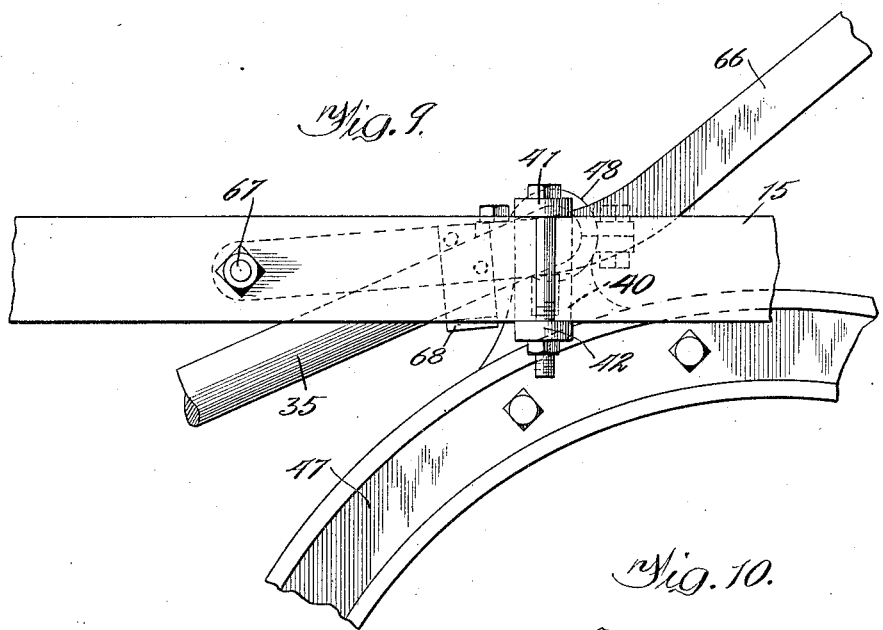
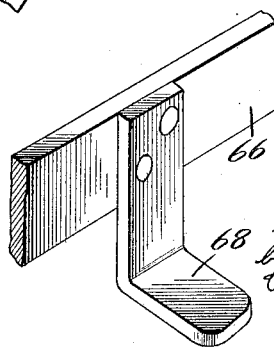

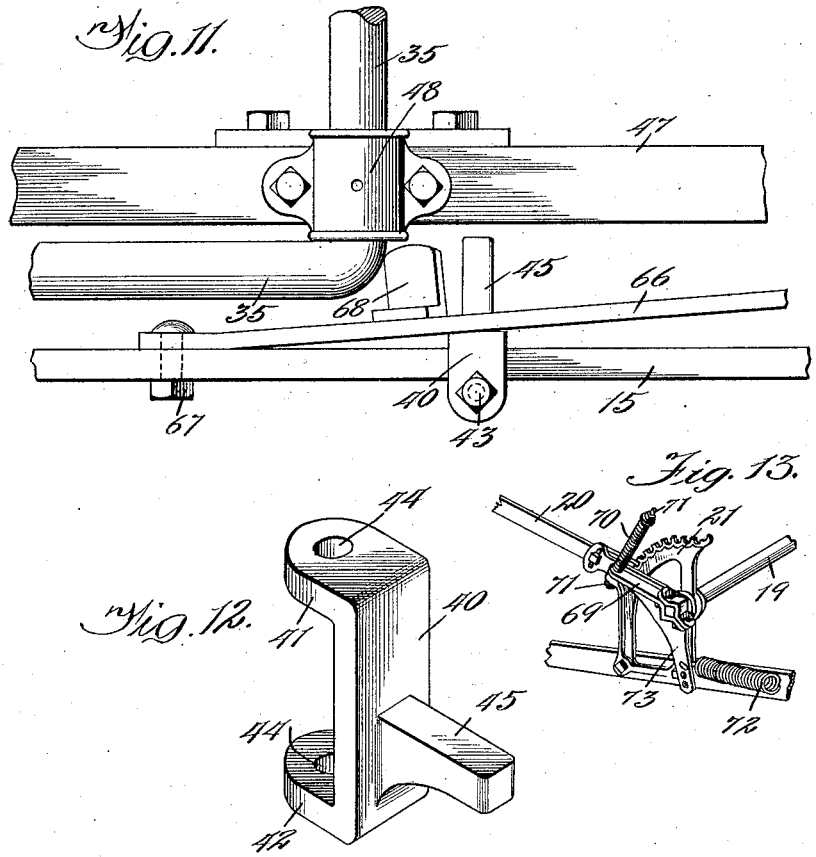

UNITED STATES PATENT OFFICE.

CARL CHRISTENSEN, OF BRADLEY, ILLINOIS, ASSIGNOR, BY MESNE ASSIGNMENTS, TO SEARS, ROEBUCK & COMPANY, OF CHICAGO, ILLINOIS, A CORPORATION OF NEW YORK.

GANG-PLOW.

1,083,594.  Specification of Letters Patent.  Patented Jan. 6, 1914.

Application filed October 7, 1907. Serial No. 396,248.

*To all whom it may concern:*

Be it known that I, CARL CHRISTENSEN, a citizen of the United States, residing at Bradley, in the county of Kankakee and State of Illinois, have invented certain new and useful Improvements in Gang-Plows, of which the following is a specification, reference being had to the accompanying drawings.

My invention relates to plows, and has particularly to do with wheeled plows.

It has for its object to provide certain improvements in the construction and arrangement of the lifting mechanism by which the plows are raised and lowered; also in the mechanism for locking the plows out of operative position, and the mechanism for holding the beams and plows properly in position while the furrow-openers are in the ground. I accomplish these objects as illustrated in the drawings and as hereinafter described. What I regard as new is set forth in the claims.

In the accompanying drawings,—Figure 1 is a side view of my improved plow, the land wheel being removed; Fig. 2 is a plan view thereof; Fig. 3 is an enlarged detail, illustrating the locking mechanism in operative position; Fig. 4 is a similar view, showing the locking mechanism in inoperative position; Fig. 5 is a plan view of the parts shown in Figs. 3 and 4; Fig. 6 is a cross-section on line 6—6 of Fig. 3; Fig. 7 is a perspective view of the latch-supporting lever; Fig. 8 is an enlarged detail, illustrating the rear portion of the rear beam and adjacent parts; Fig. 9 is a similar view, showing different positions of the parts from those in Fig. 8; Fig. 10 is a perspective view, showing the emergency lifting-lever; Fig. 11 is a plan view of the parts shown in Fig. 8; Fig. 12 is a perspective view of the adjustable rear stop; and Fig. 13 is a detail, illustrating in side elevation the connections of the lever by which the land-wheel axle is adjusted.

Referring to the drawings,—14—15 indicate the side-bars of the frame, and 16—17 the front and rear bars thereof. The frame may however be made in any suitable way.

18 indicates the land wheel, mounted on a bent axle 19 suitably journaled on the frame, across which it extends about midway of the length thereof. The axle 19 may be rocked to vary the height of the land side of the frame by means of a lever 20 having the usual locking devices for engaging a segmental rack 21 secured on the frame, as shown in Fig. 1.

22 indicates the seat-support mounted on the frame of the machine between its ends but nearer the rear than the front thereof.

23 indicates the seat.

24 indicates the furrow-wheel mounted at the lower end of the usual spindle 25 having a crank arm 26 by which it may be rotated to change the angular position of the furrow-wheel.

27 indicates a rear caster-wheel carried by a spindle 28, the upper portion of which extends vertically, and is fitted in a suitable sleeve 29, as shown in Figs. 1 and 2.

30 indicates a crank arm at the upper end of the spindle 28, which is connected by a connecting-rod 31 with the crank arm 26 in the usual way to secure coöperation between the furrow-wheel and the caster-wheel.

32 indicates a hand-lever for vertically adjusting the furrow-wheel side of the frame on the furrow-wheel spindle, said lever having the usual segmental rack 33 for locking it in different positions of adjustment.

34—35 indicate front and rear arches or bails, respectively, which extend transversely of the machine frame and are pivotally mounted at their ends in suitable supports. As shown in Fig. 1, depending brackets 36—37 are provided at the left-hand side of the machine, but any other suitable means may be employed. As shown in Fig. 1, the rear arch 35 is somewhat longer than the front arch 34 and extends higher above the frame when the plows are in their uppermost position. Both arches extend forward and upward from their pivots and serve to support the plow-beams and control them when lifted or depressed, as hereinafter described.

38—39 indicate stops bolted or otherwise firmly secured to the front bar 16 of the frame in position to intercept and support the arch 34 when it is in its lowermost position. Said stops are placed at such a height as to prevent the front arch from moving down beyond the proper point at which the forward ends of the beams are to be supported when the plows are in the ground and therefore insure the holding of the plows in proper position while in operation. For a like purpose a stop 40 is provided at the rear portion of the side bar 15, said stop serving to intercept and support the rear arch 35 when in its lowermost position. The stop 40 is shown in Figs. 11 and 12, from which it will be seen that it is provided with lugs 41—42 adapted to embrace the side bar 15, a pin or bolt 43 being passed through holes 44 in said lugs to hold the stop in place. A lug 45 projects inward into the path of the arch 35. By adjusting the stop 40 back and forth on the side bar 15, the point to which the arch 35 may be lowered is varied.

46—47 indicate the plow-beams, which, as shown in Fig. 2, are pivotally connected to the arches 34—35 by suitable couplings 48.

49—50 indicate the plows carried by the beams 46—47, respectively.

Obviously, by swinging the arches 34—35 forward and downward the plows are moved downward so as to engage the ground and may be lifted out of operative position by reverse movement of the arches.

The front ends of the beams are connected by a frame 51 to which is connected a draft device 52 so that the draft is applied directly to the beams.

53 (Figs. 1 and 2) indicates a link pivotally connected with the beams 46 in front of the arch 35 and extending up over said arch where it is connected to the forward end of a spring 54, the rear end of which is connected with the rear portion of the frame preferably by means of a bracket 55. The connection of the spring 54 with the bracket 55 is made by means of a bolt 56, so that the tension of the spring may be adjusted. The spring not only serves to assist in lifting the beams, but when the beams are in their lowered or operative position the spring causes the link 53 to press down on the rear arch or bail, thus holding the rear portions of the beams firmly down on the stop.

For ordinarily raising and lowering the plows foot-levers are provided, as best shown in Figs. 1, 2 and 3 to 7. As best shown in Figs. 1 and 3, 57 indicates a foot-lever pivoted at 58 on the frame of the machine. The forward end of said lever projects forward and upward and is connected by a link 59 with the forward portion of the beam 46, said link being pivoted upon a boss 57ª carried by the lever 57, as shown in Fig. 7. The lever 57 is employed for raising the plows. For lowering the plows a combined lever and latch 60 is provided, which is pivotally mounted in a slot 61 in the forwardly-extending portion of the lever 57, as shown in Figs. 3 and 7,—62 indicating the pivot of the lever 60. As also shown in Figs. 3 and 7, the slot which receives the lever 60 also limits the extent to which it may rock therein, so that it is held approximately perpendicular to the lever 57, extending therefrom toward the operator's seat. The lever 60 is provided with a lug 63 which forms a latch which is adapted to fit over the land-wheel axle 19 when said lever 60 is in its rearmost position, as shown in Fig. 3. Said lever may, however, be readily disengaged from the axle 19 by forward pressure of the operator's foot. A spring 64 connected with the lower end of the lever 60 and with the forward portion of the lever 57 serves to hold the upper portion of the lever 60 normally in its rearmost position, so that it automatically engages the axle 19 when the lever 57 is operated to raise the plow-beams to their uppermost position. At its forward end the lever 57 carries a set-screw 65, which may be set to vary the extent to which the forward end of said lever may be swung.

From the foregoing description, it will be seen that by depressing the rear end of the lever 57 the front ends of the beams 46—47 are raised by means of the link 59, and if raised to a sufficient height the latch-lever 60 will engage the axle 19 and lock the beams in their uppermost position. The spring 54 assists in lifting the beams as it pulls back on the arches or bails 34—35, and consequently swings them upward. When the plows are to be lowered, the operator disengages the latch-lever 60 by pressing forward on it with his foot, whereupon the weight of the plows causes them to drop and run into the ground to the depth predetermined by the setting of the stops 38—39—40. In practice the beams hang suspended from the frame when in operation, they being below the surface of the soil, and the share divides the earth, lifting and turning the soil with only the cutting edge of the share coming in contact with the bottom of the furrow. The two bails hold the beams rigidly in one position which is of great advantage in plowing in irregular soil.

For use in emergencies in addition to the foot-levers above described I also provide a hand-operated lifting-lever 66 pivotally connected at 67 with the frame and having a lug 68 which extends under the arch or bail 35, as shown in Fig. 2 (see also Figs. 8 to 11). By raising the lever 66 the front portion of the rear bail is lifted, thereby lifting the beams.

For cushioning the land-wheel axle 19 the lever 20 (see Fig. 13) is provided with an arm 69 which moves with said lever and engages a spring 70 which is mounted on a bolt 71 carried by and projecting upwardly from the rack 21. The weight sustained by the land-wheel axle acts to compress the spring 70, when the lever 20 is unlocked, so that the spring acts as a cushion.

72 (see Figs. 2 and 13) indicates a spring connected at its rear end with an arm 73 extending down from the lever 20, and at its forward end with the frame of the machine.

Said spring serves to assist in operating the lever 20 to rock the land-wheel axle.

The operation of my improved gang plow has to some extent been already described, but it may be explained that in ordinary use the driver relies altogether upon the foot-levers for raising and lowering the plows. By depressing the lever 57, upward and backward pull is applied to the beams, thereby swinging the upper portions of the bails 34—35 backward and upward and raising the plows to the position shown in Fig. 1. When the plows have been lifted to a sufficient height, the latch-lever 60 engages the land-wheel axle, thereby locking the plows in their raised position. In the lifting operation the spring 54 exerts backward pull on the beams, thereby very materially assisting in lifting the plows. When the plows are to be lowered, the operator presses forward on the latch-lever 60 releasing it from the land-wheel axle and thereby allowing the weight of the plows to swing the bails 34—35 forward and downward so that the plows run into the ground point first. When the plows have reached the proper depth, the bails are arrested by the stops 38—39—40 and held so that the plows remain in proper operative position. When the plows are in the ground, the spring 54 by reason of the fact that its connection 53 extends over the rear bail 35, serves to exert downward pressure on the arch and helps to hold the plows in the ground. If desired, the plows may be locked in the ground by pressing the latch-lever 60 far enough forward to bring the link 59 in line with the lever 57, as shown in Fig. 4. The seat is set far enough forward to equalize the weight more nearly.

It will be noted that the rear bail is longer than the front one and when swung upward rises to a higher point, so that the heel of the plow is raised more quickly and also raised higher than the point. This facilitates the withdrawal of the plow from the ground and also causes the point to penetrate the soil first when the plow is lowered.

That which I claim as my invention, and desire to secure by Letters Patent, is—

1. In a plow, the combination of a wheeled frame, bails pivotally supported by said frame and adapted to swing forward and downward, a plow beam supported at the front and rear by said bails, respectively, a lever for swinging said bails, and a spring connected with the frame independently of said lever and with the plow beam and operating over said rear bail to exert downward pressure upon the plow when the same is in the ground.

2. In a plow, the combination of a wheeled frame, a plow-beam, a swinging member supporting said beam, and adapted by its swinging to raise and lower the same, and a spring connected with the frame at one side of said swinging member and with the beam at the other side of said swinging member, and acting to exert downward pressure upon said swinging member when the plow is in the ground.

3. In a plow, the combination of a wheeled frame, bails pivotally supported by said frame and adapted to swing forward and downward, a plow beam supported at the front and rear by said bails, a lever for swinging said bails, a spring connected with the frame independently of said lever and with the plow beam and operating over said rear bail to assist in lifting the beam and also to exert downward pressure upon the beam when the plow is in the ground, and rigid means for limiting the extent to which the beam may be lowered.

4. In a plow, the combination of a wheeled frame having an arched axle, bails pivotally supported by said frame and adapted to swing forward and downward, a plow beam supported at the front and rear by said bails, a lever for swinging said bails, and a second lever adapted to operatively engage the rear bail for lifting the rear portion of the beam, said first lever being adapted to lift the rear bail independently of said second lever.

5. In a plow, the combination of a wheeled frame, a plow-beam, front and rear bails pivotally supported by the frame and adapted to swing forward and downward, means connecting said beam with said bails, and a spring connected with the frame at one side of the rear bail and with the beam at the other side of said bail and acting to exert downward pressure upon the rear bail when the plow is in the ground.

6. In a plow, the combination of a wheeled frame, a plow-beam, front and rear bails pivotally supported by the frame and adapted to swing forward and downward, means connecting said beam with said bails, and a spring connected with the frame at one side of the rear bail and with the beam at the other side of said bail and acting to exert backward pressure on said beam, said spring being arranged to exert downward pressure upon the rear bail when the plow is in the ground.

7. In a plow, the combination of a wheeled frame, a plow-beam, front and rear bails for said plow-beam pivotally supported at their lower ends by said frame and adapted to swing forward and downward, said plow-beam being connected with the upper portions of said bails, and a spring connected with the beam in advance of the rear bail and with the frame back of said rear bail and operating over said rear bail to assist in lifting the beam and to press the plow into the ground when the same is lowered to operative position.

8. In a plow, the combination of a wheeled frame, a plow-beam, rocking supports for said plow-beam pivotally supported at their lower ends by said frame and adapted to swing forward and downward, said plow-beam being connected with the upper portions of said supports, and a spring connected with the frame back of one of said swinging supports and with the beam in advance of the latter support for assisting in lifting the beam.

9. In a power shovel, in combination, a wheeled frame, a plow-beam, rocking supports for said plow-beam pivotally supported at their lower ends by said frame and adapted to swing forward and downward, said plow-beam being connected with the upper portions of said supports, and a spring connected with the frame back of one of said swinging supports and with the beam in advance of the latter support, said spring connection extending over and bearing upon the latter support whereby said spring acts to press the plow into the ground when it is lowered into operative position.

10. In a plow, the combination of a wheeled frame, front and rear bails extending transversely thereof and having their ends pivotally supported thereby, one or more beams connected with said bails, and a spring connected at its rear end with the rear end portion of the frame and at its forward end with one of the beams in advance of the rear bail, the forward portion of said spring extending above the rear bail and being arranged to bear downward thereupon.

11. In a plow, the combination of a wheeled frame, front and rear bails extending transversely thereof and having their ends pivotally supported thereby, one or more beams connected with said bails, a spring connected at its rear end with the rear end portion of the frame and at its forward end with one of the beams in advance of the rear bail, the forward portion of said spring extending above the rear bail and being arranged to bear downward thereupon, and stops fixedly carried by the frame for limiting the downward movement of the bails.

12. In a plow, the combination of a wheeled frame, front and rear bails extending transversely thereof and having their ends pivotally supported thereby, one or more beams connected with said bails, a lifting spring, means connecting the rear end portion of said spring with the frame, and a link connected with the front portion of said spring and with one of the beams, said link extending over and being adapted to exert downward pressure upon the rear bail.

CARL CHRISTENSEN.

Witnesses:
WM. R. BOND,
T. N. MAINS.

---

Copies of this patent may be obtained for five cents each, by addressing the "Commissioner of Patents. Washington, D. C."